B. RANDALL.
Broadcast-Seeder.

No. 70,898.            Patented Nov. 12, 1867.

Witnesses:

Inventor:

United States Patent Office.

BENJAMIN RANDALL, OF ADAMS, NEW YORK.

Letters Patent No. 70,898, dated November 12, 1867.

---

IMPROVEMENT IN COMBINED HARROW AND SEEDER.

---

The Schedule referred to in these Letters Patent and making part of the same.

---

TO ALL WHOM IT MAY CONCERN:

Be it known that I, BENJAMIN RANDALL, of Adams, in the county of Jefferson, and State of New York, have invented a new and improved Combined Harrow and Seeding Machine; and I do hereby declare that the following is a full, clear, and exact description thereof, which will enable others skilled in the art to make and use the same, reference being had to the accompanying drawings, forming a part of this specification.

This invention relates to a new combined harrow and seeding machine, whereby ground may be harrowed and grain and grass-seed sown at the same time. The harrow portion of the device is substantially the same as that patented by James M. Freeman, August 27, 1867, the right and title of which is now duly vested in me, by virtue of assignments duly recorded in the Patent Office. By means of the seeding attachment the device is rendered far more valuable than hitherto, as two machines are combined in one, both operating simultaneously, and saving a great deal of time and labor, without adding materially to the expense of the original harrow device, and without increasing in an appreciable degree the draught of the same. In the accompanying sheet of drawings—

Figure 1:
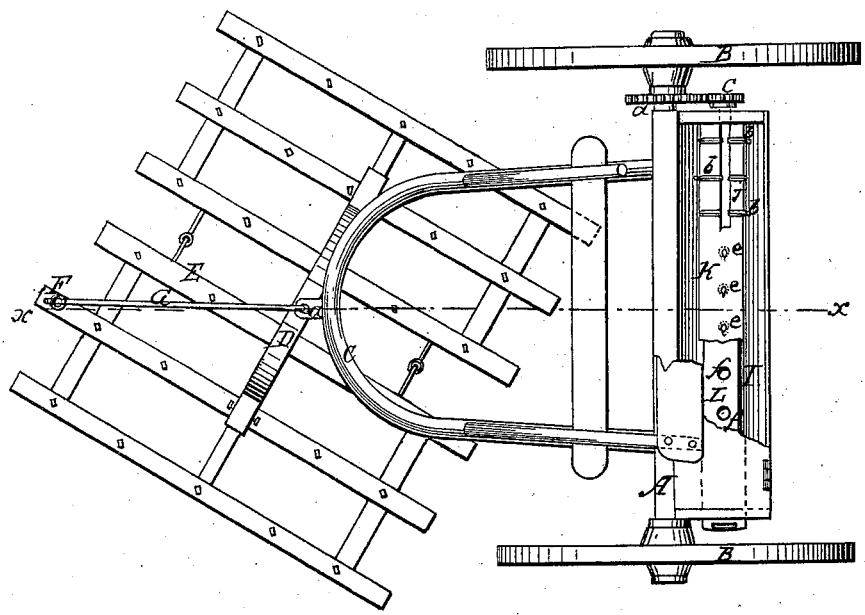
Figure 2:
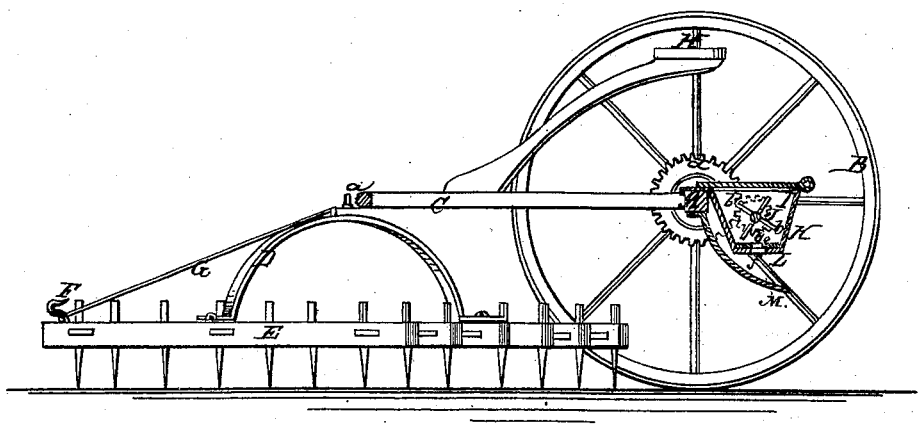

Figure 1 is a plan or top view of my invention.
Figure 2, a side sectional view of the same, taken in the line $x\,x$, fig. 1.
Similar letters of reference indicate corresponding parts.

A represents an axle having a wheel, B, on each end, and C is a bow-shaped thill attached to the axle, and resting upon the spring D, secured upon a harrow, E, to which the team is attached; the clevis or draught-hook F on the harrow, to which hook the double-tree is attached, being connected to the thill C by a chain or rod, G, the thill being connected to the spring by a bolt, $a$. These parts are substantially the same as the harrow patented by James M. Freeman, and previously referred to. H is the driver's seat, the supports $b$ of which are attached to the thill C, as in the original machine. To the rear side of the axle A a seed-box, I is secured, said seed-box extending nearly the whole length of the axle, and having placed within it a longitudinal shaft, J, provided with arms $b$. This shaft J extends through one end of the seed-box I, and has a pinion, $c$, upon it, into which a wheel, $d$, attached to the hub of one of the wheels B, gears. By this means the shaft J is rotated, as the machine is drawn along, and the seed in the seed-box I prevented from choking or clogging in the same, and made to pass through holes $e$ in a perforated slide, K, at the bottom of the hopper. The holes $e$ in this slide are of V form, and rounded at their wide end, as shown clearly in fig. 1, and underneath this slide is the bottom L of the hopper, which is perforated with circular holes $f$ of greater diameter than the widest part of the holes $e$ in slide K. By adjusting the slide K so that its holes $e$ will register more or less perfectly with the holes $f$ in the bottom L, the capacity of said holes $f$ may be varied as desired, to regulate the discharge of seed, and a greater or less quantity of seed sown on a given area, as may be required. To the rear part of the axle A a scattering-board or plate, M, is attached, said board extending down underneath the seed-box I, to receive the seed dropped from the same, and scattering it so that it will fall upon the ground in a broadcast state.

In sowing grain and seeding down land with grass-seed, this invention will prove to be valuable, and effect a great saving in labor. In sowing grain, the seed is dropped directly in the rear of the harrow, the latter preparing the ground to receive the grain, and after the latter is sown the seed-box is supplied with grass-seed, the slide K being adjusted so that the required quantity of grass-seed will be sown on a given area of ground, and the machine again drawn over the ground, the harrow in the latter operation covering the grain-seed.

I claim as new, and desire to secure by Letters Patent—

1. The shaft J in the seed-box I, provided with the radial arms $b$, and rotated by means of suitable gears from one of the wheels B, when the same is in combination with the scattering-board or plate M, and all arranged substantially as described and for the purpose set forth.

2. The slide K, perforated with the V-shaped holes $e$, and fitting in the seed-box I, in combination with the perforated bottom L of the seed-box, which is perforated with circular holes $f$, and the scattering-board or plate M, the whole being constructed, arranged, and operating substantially as and for the purpose specified.

3. The combination of the harrow, connected with the truck or mounted frame, and the seed-distributing apparatus applied to said frame, all arranged substantially in the manner as and for the purpose set forth.

B. RANDALL.

Witnesses:
SAMUEL C. JONES,
J. ALISON FRASER.